US006608267B2

(12) United States Patent
Fischer et al.

(10) Patent No.: US 6,608,267 B2
(45) Date of Patent: Aug. 19, 2003

(54) FOOT SWITCH INCLUDING ELASTIC JOINT FOR PROPER POSITIONING OF SWITCH COMPONENT

(75) Inventors: Klaus Fischer, Nagold (DE); Ralf Kühner, Stuttgart (DE)

(73) Assignee: Erbe Elektomedizin GmbH, Tubingen (DE)

( * ) Notice: Subject to any disclaimer, the term of this patent is extended or adjusted under 35 U.S.C. 154(b) by 0 days.

(21) Appl. No.: 09/992,434

(22) Filed: Nov. 16, 2001

(65) Prior Publication Data

US 2002/0070840 A1 Jun. 13, 2002

(30) Foreign Application Priority Data

Nov. 21, 2000 (DE) ........................................ 100 57 589

(51) Int. Cl.$^{7}$ .......................... H01H 3/14; H01H 35/00; G05G 1/14; A61C 1/02

(52) U.S. Cl. .......................... 200/86.5; 338/2; 338/153; 307/119; 433/101

(58) Field of Search ............................ 200/86.5, 61.89; 338/108, 153, 215, 2, 5; 433/101; 307/119

(56) References Cited

U.S. PATENT DOCUMENTS 2,636,092 A * 4/1953 Schnider .................. 200/61.29
2,671,268 A * 3/1954 Crawford .................... 433/101
3,471,928 A * 10/1969 Billin ......................... 433/101
3,742,167 A * 6/1973 Muther ...................... 200/86.5
3,970,984 A * 7/1976 Grubenmann ............... 338/153
3,980,849 A * 9/1976 Straihammer .............. 200/86.5
5,324,900 A * 6/1994 Gonser et al. ............. 200/86.5
5,422,521 A * 6/1995 Neer et al. .................. 307/119
6,051,797 A * 4/2000 Meinel ....................... 200/86.5
6,150,623 A * 11/2000 Chen ......................... 200/86.5

FOREIGN PATENT DOCUMENTS

DE 2937031 A * 4/1981
DE 40 05 059 C2 4/1990
DE 3512665 C2 * 6/1994
DE 4329301 C2 * 7/1995
DE 19622557 C1 * 11/1997
DE 198 01 152 A1 7/1999

* cited by examiner

*Primary Examiner*—J. R. Scott
(74) *Attorney, Agent, or Firm*—Marshall, Gerstein & Borun

(57) ABSTRACT

A foot switch for use in the control of medical apparatus comprises a pedal that is connected to and movably seated on a floor plate of a joint connection, a sensor linked to a switch element, and a repositioning device disposed between the floor plate and the pedal. The repositioning device ensures that an operating force must be applied to the upper surface of the pedal to produce a tilting movement of the pedal out of an initial position into an operating position in which a smaller angle is defined between the floor plate and the pedal than in the initial position and in which the sensor is activated to trigger the output of a switch pulse from the switch element. The improvement of the present invention consists of the combination of the repositioning device and the joint into an elastic joint device. The simplified foot switch is easily disinfected.

19 Claims, 4 Drawing Sheets

FOOT SWITCH INCLUDING ELASTIC JOINT FOR PROPER POSITIONING OF SWITCH COMPONENT

FIELD OF THE INVENTION

The present invention relates to a foot switch, in particular for use in medical applications.

DESCRIPTION OF THE PRIOR ART

In the medical area, particularly in hospitals, a high degree of hygiene is demanded. Especially in operating rooms compliance with rigorous criteria for hygiene is required, in order to make sure that infectious agents are eliminated as far as possible before surgery on humans is performed. Therefore the medical instruments and measurement devices must be disinfected, so that all such germs are killed. If the disinfection is not performed properly, there is an increased risk that germs will be transferred into the bodies of the patients who are being treated. So that even relatively inaccessible parts of medical apparatus can be efficaciously disinfected, in some cases these devices must be taken apart to separate their individual components. This category includes the foot switches used to control medical equipment, the mechanical construction of which is such that parts of them are not readily accessible.

A common feature of the known arrangements is that while they are in use—in which regard special mention should be made of the high humidity in an operating room, which is problematic for such apparatus—corrosion is produced in the foot switch, in particular in the joint region. This corrosion not only interferes with operation of the switch, by causing it to become jammed and hence not fully functional, but also makes it difficult to disassemble the switch completely, so that it is inadequately disinfected.

SUMMARY OF THE INVENTION

The object of the invention is to provide a foot switch of the kind described above in which simple and effective disinfection can be carried out in all parts of the switch.

According to the present invention there is provided a foot switch for use in the control of medical apparatus comprising floor plate; a pedal that is connected to and movably seated on the floor plate by means of a joint connection; a switch element; a sensor linked to the switch element; and a repositioning means disposed between the floor plate and the pedal and operable so that an operating force must be applied to the upper surface of the pedal to produce a tilting movement of the pedal out of an initial position into an operating position in which a smaller angle is defined between the floor plate and the pedal than in the initial position and in which the sensor is activated to trigger the output of a switch pulse from the switch element; the repositioning means and the joint connection being combined into an elastic joint means.

Hence, the parts responsible for bearing and repositioning the pedal, namely the joint connection, which is typically a metallic shaft, and the repositioning device, which is typically a spring means, are combined into a single elastic joint means. As a result, the number of components that need to be disinfected is reduced. Furthermore, components susceptible to corrosion are eliminated, so that it is always possible to separate the individual components of the switch from one another, and correct operation is always guaranteed. In addition, all the parts of the switch are readily accessible and hence can be effectively disinfected. Preferably, the elastic joint means is made of a rubber material. When force is applied to the upper surface of the pedal, a switch pulse is generated and is transmitted to medical devices. The force needed for this purpose is preferably adjustable. This can be achieved by limiting the flexibility of the elastic material to various degrees, by means of an adjustment or screw means. As the material is increasingly compressed, its stiffness becomes greater and its elasticity is reduced. As a result, more force must be exerted on the surface of the pedal in order to initiate a switching process.

Furthermore, the elastic joint means can be made of a number of different materials, or of a given material with variable consistency so that its elasticity varies. When the elastic joint means is made of stiff materials, an increasing amount of force must be exerted on the surface of the pedal in order to initiate a switching process. It is also possible to adapt the shape of the material according to the desired amount of applied force: materials with a smaller cross-sectional area are less stiff. In addition, a spring means can be positioned between the floor plate and the pedal.

In order to preserve a section with large area to ensure firm connection with the floor plate and the pedal, the stiffness can be sufficiently reduced by removing some of the material in particular regions, so that the cross-sectional area is reduced only in these regions.

Preferably all the individual components of the foot switch are connected to one another by means of connecting means so constructed that the components can be separated from one another without any special tools. Hence the switch can be taken apart simply and rapidly. Especially in the difficult working conditions experienced by medical personnel, this aspect makes a substantial contribution towards effective disinfection.

To enable reliable operation of the switch even under difficult working conditions, between the pedal and the floor plate a guide device is disposed, so constructed that even if force is applied at an angle, it is possible to trigger a switch pulse. If the joint is wide enough in the direction of the axis of tilt, such a special guide device becomes unnecessary.

To make sure that the foot switch operates precisely, it is necessary for the pedal always to be in exactly the same position when it is at rest, i.e. when no force is being applied. Therefore retaining devices are provided, which can be adjusted in such a way that the resting position of the pedal is as desired by the user. When the elastic joint means is constructed as a “rubber block”, it can simultaneously function as such a retaining device.

So that several items of medical equipment can be controlled separately, a foot switch with several separate pedals, elastic joint means and switch elements is provided. This design saves space and therefore facilitates the user’s work. The foot switch can also be constructed with a handle so that it is easy to transport.

The switch element can be constructed in very different ways. A switching process can be transmitted by pneumatic or hydraulic means and converted by way of a pressure sensor into an electrical signal that is then sent to the medical device. A switching process can also be detected by an electrical sensor, which can operate in various ways: by capacitance, inductance, by means of a potentiometer, or by way of strain gauges mounted on a surface that can be deformed by movement of the pedal. Furthermore, an optical sensor can be used to convert a switching process into an electrical signal. In this case a tilting movement of the pedal is detected by a change in a light beam. In another embodiment, in addition to a discrete signal control (switching on and off) an analog signal control (adjustable voltage) can be provided. For this purpose the angle of the tilting movement is converted into a corresponding electrical signal. It is also possible for the surface of the elastic joint means to be provided with strain gauges arranged in such a way that a variable number thereof are stretched and compressed.

In the embodiment of the switch element with special sensors, in particular the designs with inductive and optical components, a switching process can be detected by non-contact means. An advantage of this design is that the switch element can be encapsulated.

Preferably the foot switch is made of plastic materials and/or of corrosion-resistant metal.

Preferred embodiments of the invention will now be described by way of example with reference to the accompanying drawings.

DETAILED DESCRIPTION OF THE PREFERRED EMBODIMENTS

Figure 1:
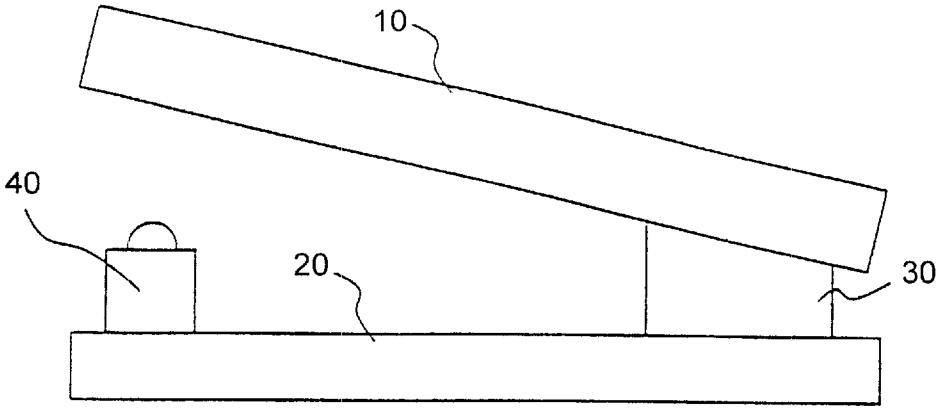
FIG. 1 is a side view of a foot switch in the unloaded position.

In the following description, the same reference numerals are used for identical parts and parts with identical actions.

Figure 2:
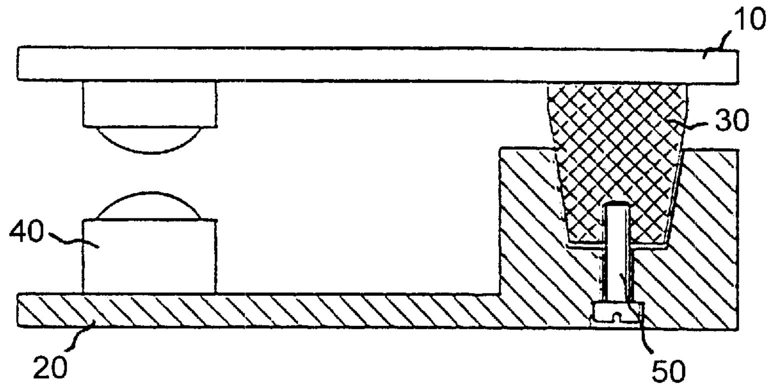
FIG. 2 is a sectional view of a foot switch with an elastic joint means that is seated in a conical cavity in a floor plate and is connected thereto by means of a threaded means.
Figure 3:
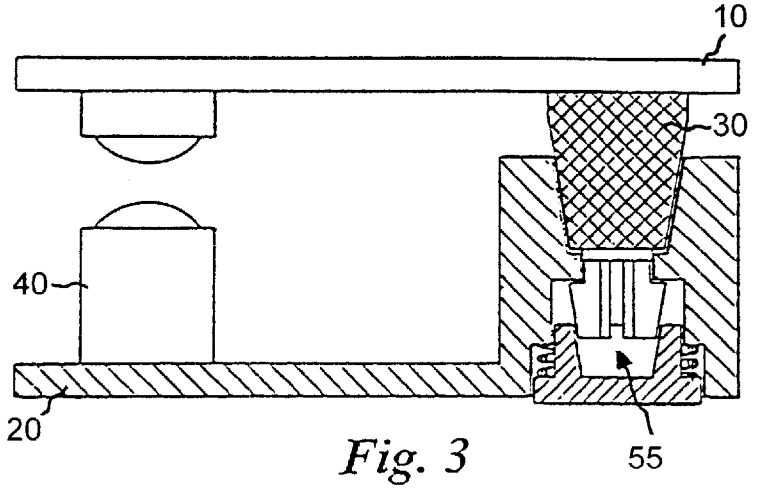
FIG. 3 is a sectional view of a foot switch with an elastic joint means that is seated in a conical cavity in a floor plate and connected thereto by means of a connecting means that can be opened and closed without use of any tool.

In FIG. 1 a side view of a foot switch is shown. The parts visible here are a floor plate 20 on which are mounted in the left-hand region a switch element 40 and in the right-hand region an elastic joint means 30, to the upper surface of which a pedal 10 is attached. The elastic joint means 30 can be molded onto or adhered to the pedal 10 and/or to the floor plate. Regarding the explanation of a releasable attachment of the elastic joint means 30 to the floor plate 20, reference is made to FIGS. 2 to 5. In these embodiments the elastic joint means has a conical shape and fits into a corresponding cavity in the floor plate 20. In the embodiment shown in FIG. 2 the elastic joint means 30 is connected from below to the floor plate 20 by means of a threaded means 50, which is countersunk into a correspondingly positioned recess in the floor plate 20. In the embodiment shown in FIG. 3 the mounting of the elastic joint means 30 on the floor plate 20 is accomplished by a connecting means 55 that has a locking action. To release this connection, no tool is needed; the device can be unlocked by hand, by pressing on a spring-loaded cover plate.

Figure 4:
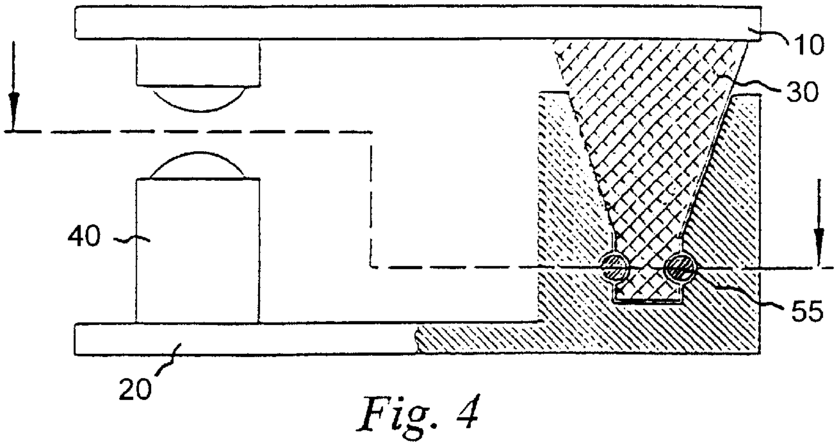
FIG. 4 is a partial section of a foot switch in side view with an elastic joint means that is seated in a conical recess in a floor plate and connected thereto by means of a clamping device.
Figure 5:
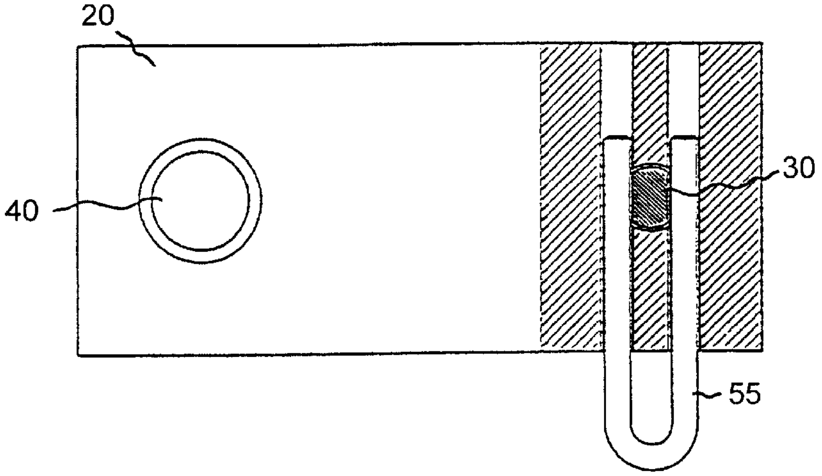
FIG. 5 is a part sectional plan view of the foot switch shown in FIG. 4.

Another embodiment of a connection between elastic joint element 30 and floor plate 20 that requires no tools is shown in FIGS. 4 and 5. Here both the elastic joint means 30 and the corresponding cavity in the floor plate 20 are provided with a groove in two regions, at the same level. At the level of the groove there is a bore that passes through the floor plate 20. A correspondingly two-pronged connecting means 55 is pushed horizontally through the floor plate 20, so that it also engages the groove in the elastic joint means 30. The connection thus created can be released at any time by removing the connecting means 55 by hand. In the embodiments shown in FIGS. 2 to 5, the pedal 10 is attached to the elastic joint means 30 by adhesive means (e.g. by molding-on, if the pedal 10 is made of suitable material). In an embodiment not shown in the figures, the pedal 10 can also be attached to the elastic joint means 30 by a suitable connecting means 55, preferably one that requires no tools.

Figure 6:
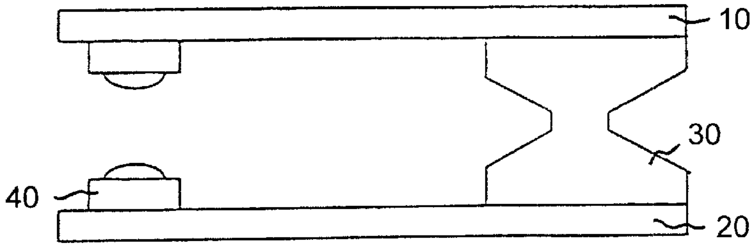
FIG. 6 is a side view of a foot switch with an elastic joint means that is provided with a conical indentation.

The drawing in FIG. 6 shows an embodiment of a foot switch with an elastic joint means 30, the spring force of which can be adjusted. For this purpose the elastic joint means 30 is provided with a circumferential notch at mid-height. In the region of this notch the cross-sectional area of the material is reduced, as a result of which the material gives way more readily when force is applied to the pedal 10. The depth of the notch can be varied, depending on how large the force acting on the pedal 10 should be in order to initiate a switching process.

Figure 7:
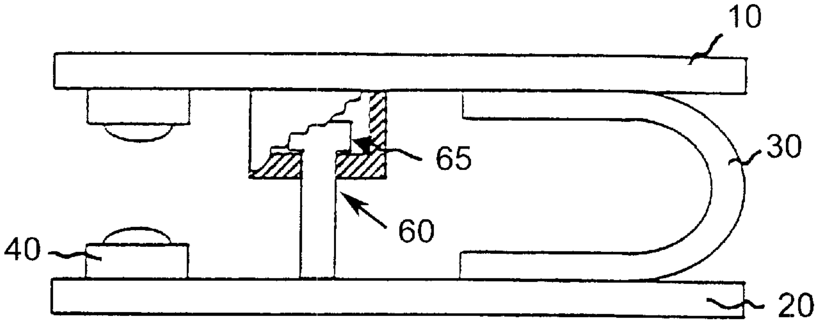
FIG. 7 is a side view of a foot switch with a guide and a retaining device shown partially in section.

In FIG. 7 an embodiment of a foot switch is shown that is provided with a guide 60 with retaining device 65. This arrangement, which limits the upward movement of the pedal, enables the upward and downward movements of the pedal 10 always to be vertical, even when the force acting on the pedal 10 is not vertically directed, and thus enables a precise switching process. This has an especially positive effect, because under the difficult conditions of an operation the user can often be standing a considerable distance away from the foot switch and actuates it by reaching out to the side, so that the force is applied to the pedal 10 at an angle different from the vertical.

Figure 8:
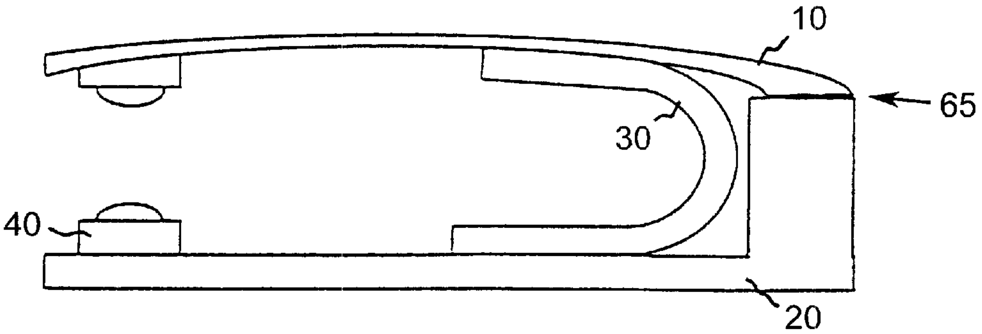
FIG. 8 is a side view of a foot switch with a retaining device.

FIG. 8 shows an embodiment of the foot switch in side view. Here a retaining device 65 is attached in such a way as to keep the position of the pedal 10 constant when it is in the resting state. In contrast to the embodiment shown in FIG. 7, in this case there is no guide device 60 with retaining device 65 between floor plate 20 and pedal 10. When the pedal 10 is in the unloaded state, its back part rests against a surface of the floor plate 20 and hence stays in this position.

Figure 9:
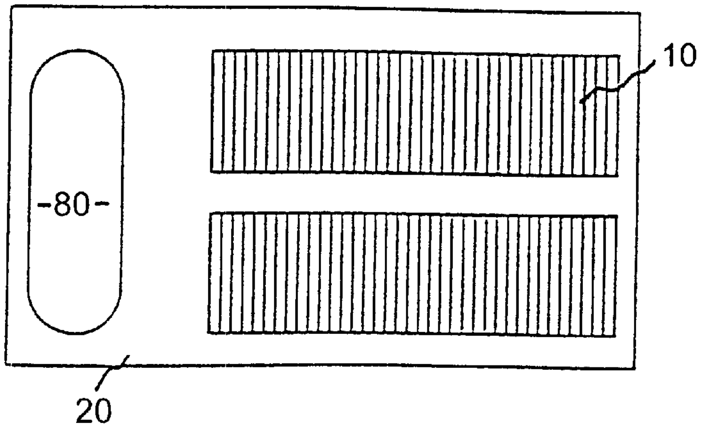
FIG. 9 is a plan view of a foot switch with two separate pedals and a handle.

FIG. 9 shows an embodiment of a foot switch that is provided with two pedals 10. The pedals 10 are connected to the floor plate 20 by way of separate elastic joint means 30. Below each pedal 10 switch elements 40 are mounted on the floor plate 20. Thus two different medical devices or functions can be controlled separately from one another, with no need to use two separate foot switches. As a result, this arrangement saves space. In this embodiment the surfaces of the pedals 10 are provided with a profile, which prevents the user from unintentionally slipping off the pedal 10. Preferably the pedals 10 can also be provided with a rubberized surface to increase the grip. The foot switch can also be provided with more than two pedals 10. In this embodiment one side of the floor plate 20 defines an aperture which is shaped to serve as a handle 80 so that when the work is finished, the foot switch can be rapidly and simply transported and stored.

Figure 10:
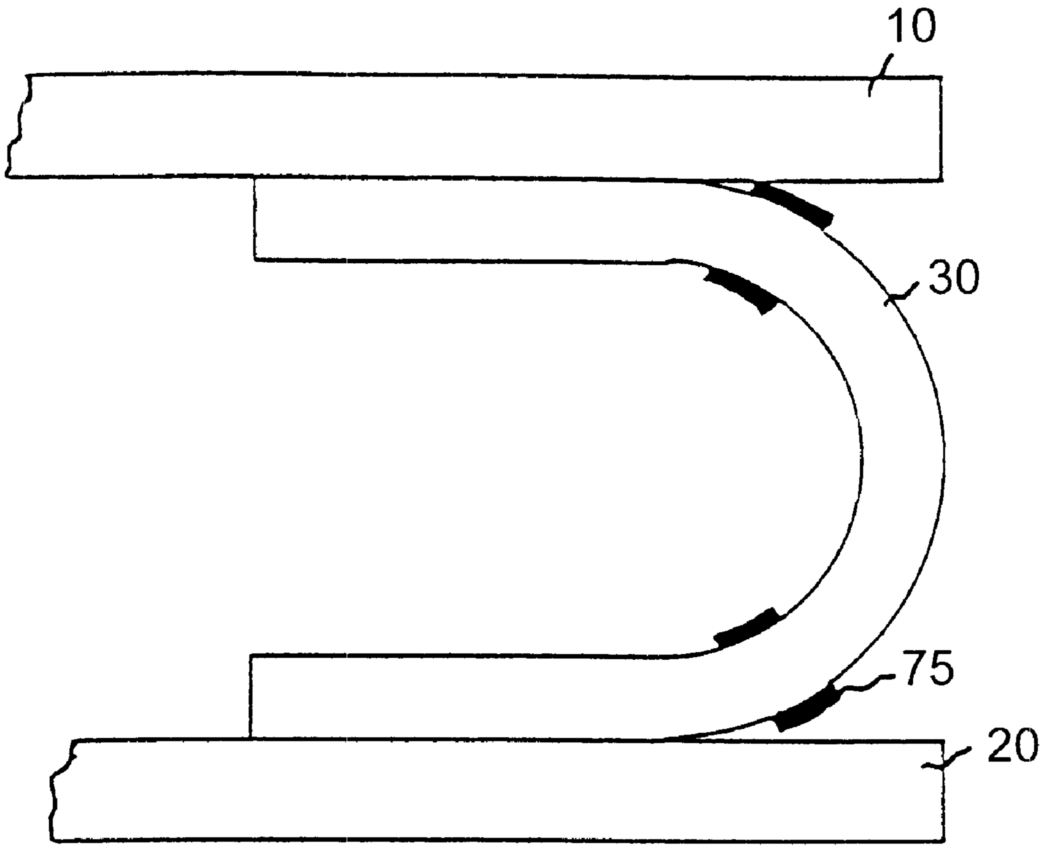
FIG. 10 is a partial view of a foot switch as seen from the side, with an elastic joint means provided with strain gauges.

FIG. 10 is a drawing of part of a foot switch that shows an elastic joint means 30 to which strain gauges 75 are attached. When the user applies force to the surface of the pedal 10, the strain gauges 75 at the outer radius are stretched and the strain gauges 75 at the inner radius are compressed, which causes their electrical resistances to be increased or reduced, respectively. The strain gauges 75 are electrically connected to a sensitive and temperature-independent full bridge, at the output of which a resistance value can be read out that is proportional to the amount of stretching of the elastic joint means 30. Depending on the user's requirements, this embodiment can be designed such that a switch pulse is triggered when the resistance exceeds a specified threshold, or else an analog control signal proportional to the amount of stretching, and hence to the amount of force applied to the pedal 10, is sent to a medical apparatus. An advantage of this embodiment lies in the fact that there is no need for a separate switch element 40. As a result, this embodiment is economical to manufacture, and can also be disinfected more simply and rapidly.

What is claimed is:

1. A foot switch for use in the control of a medical apparatus comprising:

a floor plate;

a pedal that is connected to and movably seated on the floor plate by an elastic joint, the elastic joint including a joint connection and a repositioning device disposed between the floor plate and the pedal;

a switch element; and a sensor linked to the switch element;

wherein the repositioning device is operable so that an operating force must be applied to an upper surface of the pedal to produce a tilting movement of the pedal out of an initial position into an operating position in which a smaller angle is defined between the floor plate and the pedal than in the initial position and in which the sensor is activated to trigger an output of a switch pulse from the switch element.

2. The foot switch as claimed in claim 1, wherein the elastic joint includes a first end and a first locking device disposed at the first end which allows the joint connection to be dissembled from the floor plate.

3. The foot switch as claimed in claim 1, wherein the elastic joint comprises a rubber element that is connected on one side to the pedal and on the other side to the floor plate.

4. The foot switch as claimed in claim 3, wherein the elastic joint is molded onto the floor plate.

5. The foot switch as claimed in claim 2, wherein the first locking device further comprises a first spring loaded cover plate which is operable without the use of tools.

6. The foot switch in claim 1, wherein a screw device is provided to permit the operating force to be adjusted by altering an amount to which a material of the elastic joint is compressed.

7. The foot switch as claimed in claim 1, wherein the operating force can be varied by a choice of an appropriate material for the elastic joint.

8. The foot switch as claimed in claim 1, wherein the operating force can be varied by modifying a shape of the elastic joint.

9. The foot switch as claimed in claim 1, comprising guide which is disposed between the pedal and the floor plate to ensure vertical movement of the pedal regardless of the angle at which the operating force is applied to the pedal.

10. The foot switch as claimed in claim 1, comprising a retaining device disposed between the pedal and the floor plate to ensure that an unloaded pedal is retained in its initial position.

11. The foot switch as claimed in claim 1, comprising a plurality of separate pedals connected to the same floor plate, each pedal being provided with its own elastic joint and switch element.

12. The foot switch as claimed in claim 1, wherein one side of the floor plate defines at least one aperture which is shaped to serve as a handle.

13. The foot switch as claimed in claim 1, wherein the sensor comprises either a pneumatic or an hydraulic sensor device.

14. The foot switch as claimed in claim 1, wherein the sensor comprises an electrical sensor with at least one of a capacitive measurement readout, and inductive movement readout, a potentiometer, and a strain gauge that is mounted such that it is deformed by a titling movement of the pedal.

15. The foot switch as claimed in claim 1, wherein the sensor comprises an optical sensor device which detects differences in the distance between the pedal and floor plate.

16. The foot switch as claimed in claim 1, comprising at least one strain gauge mounted on the elastic joint.

17. The foot switch as claimed in claim 1, wherein the joint connection includes a spring-loaded cover plate which allows the joint connection to move from a locked position to an unlocked position by pressing the spring loaded cover plate.

18. The foot switch as claimed in claim 2, wherein the elastic joint includes a second end and a second locking device disposed at the second end which allows the repositioning device to be dissembled from the pedal.

19. The foot switch as claimed in claim 18, wherein the second locking device further comprises a second spring loaded cover plate which is operable without the use of tools.

* * * * *

UNITED STATES PATENT AND TRADEMARK OFFICE

CERTIFICATE OF CORRECTION

PATENT NO. : 6,608,267 B2
DATED : August 19, 2003
INVENTOR(S) : Klaus Fischer et al.

It is certified that error appears in the above-identified patent and that said Letters Patent is hereby corrected as shown below:

Column 6,
Line 12, delete "comprising guide" and insert -- comprising a guide --.
Line 14, delete "ensure vertical" and insert -- ensure a vertical --.

Signed and Sealed this

Twentieth Day of July, 2004

JON W. DUDAS
*Acting Director of the United States Patent and Trademark Office*